March 1, 1949.    L. A. WOODLAND ET AL    2,463,009
LEADER SPOOL
Filed June 3, 1946
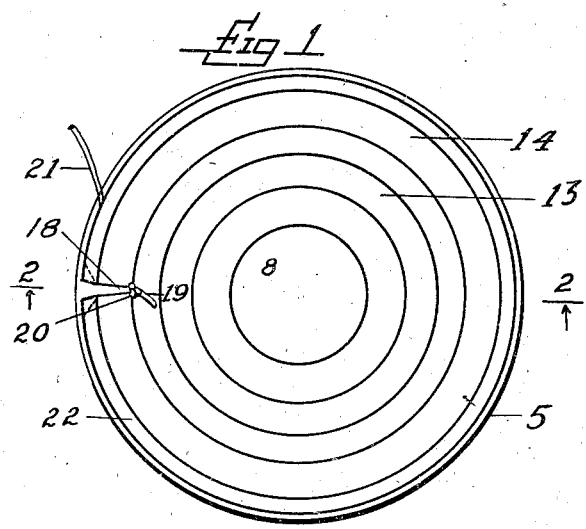
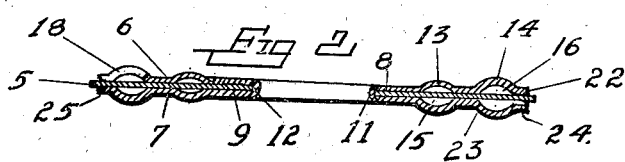
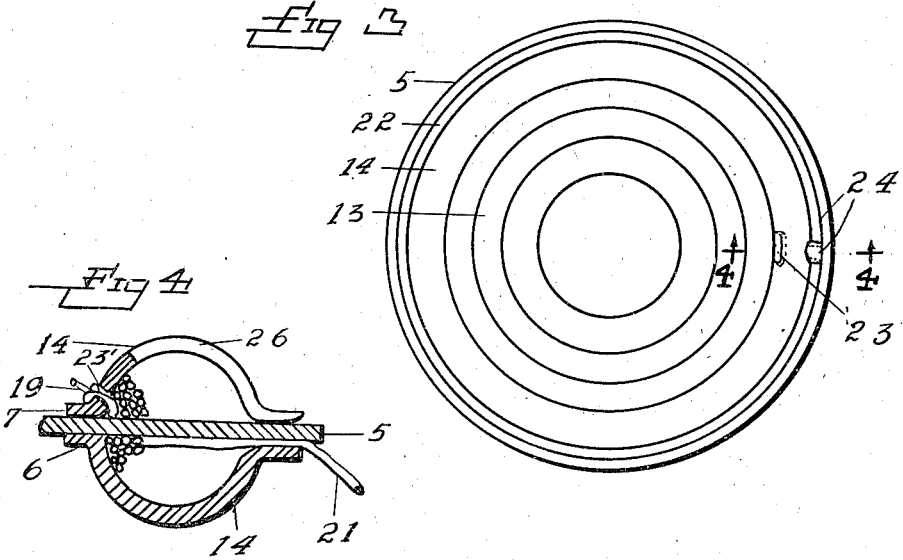
INVENTORS
LESTER A. WOODLAND
GLENN E. GAGE
BY Patented Mar. 1, 1949

2,463,009

UNITED STATES PATENT OFFICE 2,463,009

LEADER SPOOL

Lester A. Woodland and Glenn E. Gage, Lewiston, Idaho

Application June 3, 1946, Serial No. 674,150

5 Claims. (Cl. 242—118)

Our invention relates to leader spools and is particularly concerned with the provision of a simple device whereby thread like materials such as leaders used in fishing may be wound upon and removed from a spool of flat shape, and retained at all times without danger of becoming tangled or unwound and with one end always in position to be readily grasped whenever a supply of the thread like material is to be withdrawn.

It is a principal purpose of our invention to provide a simple, easily stored or carried spool upon which thread like material can be wound and from which the material can be removed. It is also a purpose of our invention to provide a novel device of this character with means whereby the thread like material is held with one end in position to be grasped by the hand and the material is prevented from unwinding or becoming tangled.

It is a further purpose of our invention to provide a novel leader spool in the form of a thin disk having provision for two different materials to be wound thereon, the construction of the spool being such that either of the quantities may be removed in part or entirely at any time without disturbing the other.

It is a further purpose of our invention to provide a novel leader spool with means whereby air is entrapped in pockets on the spool so that the device will float on water and thus be easily recovered in case that it is dropped into the water.

The novel features that we consider characteristic of our invention are set forth with particularity in the claims. The invention itself, however, both as to its organization and its method of operation, together with additional objects and advantages thereof, will be understood from the description of a specific embodiment when read in connection with the accompanying drawings, in which:

Figure 1 is a plan view of a leader spool embodying our invention;

Figure 2 is a sectional view taken on the line 2—2 of Figure 1;

Figure 3 is a view like Figure 1 but illustrating the opposite side of the leader spool from that shown in Figure 1; and Figure 4 is an enlarged fragmentary sectional view on the line 4—4 of Figure 3 showing a modified attaching means.

Referring now to the drawings, our invention is embodied in a spool which is composed of a central disk 5 of any suitable material. Preferably we employ either a fibrous material impregnated with a suitable water proofing compound or we make the disk of plastic material such as the synthetic resin compounds now used for molding. The disk 5 is covered on both sides by sheets 6 and 7 which are of a transparent resilient material. For this material we prefer to use the sheet plastic materials such as those made of synthetic resin compounds. The materials of which the disk sheets 6 and 7 are made, however, may be varied greatly since the essential feature is that the sheets shall have substantial rigidity but be capable of yielding slightly, or alternatively, the disk 5 must be yielding. The two sheets 6 and 7 are so constructed that they may be cemented or otherwise adhered to the disk 5 at the engaging surfaces indicated at 8 and 9 on the drawings. The disk 5 and the sheets 6 and 7 have the centers cut out as illustrated at 10 and desirably the inner edges of the sheets 6 and 7 may be overlapped as shown at 11 and 12 so as to secure them at this point.

The sheets 6 and 7 are circular and are molded to provide two annular bulges 13 and 14 so as to leave spaces at 15 and 16 between the sheets and the disk 5. The inner spaces 15 on the opposite sides of the disk 5 are primarily intended as air pockets in which air is entrapped in order to insure floating of the device in case it falls in the water. The spaces 16 are the spaces in which the leader or other thread like material is stored. It will be noted from Figure 1 that a narrow V-shaped notch 18 is cut in the sheet 6 from the periphery thereof across the bulge portion 14, the notch being quite sharp at the inner edge of the portion 14. This notch is utilized as shown in Figure 1 as a means of securing one end of the material 19. The material may desirably be knotted as indicated at 20 so as to secure it in the notch 18. The material is then wound in the opening 16 to the desired amount and the free end 21 thereof is left projecting from rim 22 of the sheet 6. The resiliency of the material of sheet 6 is sufficient to clamp the thread and hold it so that the free end 21 can be grasped at any time that it is desired to remove additional material. The outer edges 18a of the notch 18 are rounded or bevelled as shown so that in winding the material on the spool or removing it, these edges will not catch.

The sheet 7 which is illustrated in plan in Figure 3 of the drawings utilizes a slightly different means of securing the thread like material. This means consists of an elongated aperture 23 formed in the bulge 14 of the sheet 7 near the inner edge thereof and a raised portion 24 in the outer rim 25. One end of the material is passed beneath the raised portion 24 and out through the opening 23 and knotted. In winding the material on or off the spool, an audible click occurs each time the material passes over the portion 24.

In Figure 4 a modification is shown. This arrangement is convenient where it is desired to secure separate lengths of material in the spool within the same chamber 16. The rim 14 has an aperture 23' and a smaller notch 26. The first length laid on can be secured by knotting one end of it after it has been passed through the notch 26 and out through the aperture 23'. This length of material can be completely wound in the chamber 16 and the free end lead out through the notch 26 so that it will be readily accessible when needed. Another length of material can be knotted at one end, to anchor it in the notch 26 and wound directly over the first length of material with its free end grasped by the clamping action of the rim 25 of the sheet 7.

The nature and advanages of our invention are believed to be clear from the foregoing description. It is also believed to be obvious that various modifications may be made in the details of construction within the scope of our invention as defined in the following claims.

Having thus described our invention, we claim:

1. A spool of the character described, comprising a base disk, a cooperating disk secured against the base disk and having adjacent its periphery an annular outwardly bulged portion surrounded by a rim portion resiliently pressing against the base disk, one of said disks having a narrow portion of its rim separated away from the other disk, providing a passage from the periphery of the spool into the bulged portion, and the bulged portion having an aperture spaced radially inward from the passage to secure one end of thread like material.

2. A spool of the character described, comprising a central disk and clamping disks secured to opposite sides thereof said clamping disks having annular outwardly bulged portions adjacent the rim thereof, the rims of said clamping disks yieldingly pressing against the central disk whereby an end of thread like material wound in the spaces between the central disk and the outwardly bulged portions of the clamping disks is clamped by the rim portions, said clamping disks each having a V-shaped notch extending inward from the peripheral edge thereof into the bulged portion for securing one end of the thread like material.

3. A spool of the character described, comprising a base disk, a cooperating disk secured against the base disk and having adjacent its periphery an annular outwardly bulged portion surrounded by a rim portion resiliently pressing against the base disk, one of said disks having means thereon to secure one end of thread like material, said means comprising a tapered notch extending inward from the disk periphery to the budged portion and terminating adjacent the inner radius of the bulged portion.

4. A spool of the character described, comprising a base disk, a cooperating disk secured against the base disk and having adjacent its periphery an annular outwardly bulged portion surrounded by a rim portion resiliently pressing against the base disk, one of said disks having means thereon to secure one end of thread like material, said means comprising a tapered notch extending inward from the disk periphery to the bulged portion, said cooperating disk having a second annular bulged portion cooperating with the base disk to form air pockets.

5. A spool of the character described, comprising a central disk and clamping disks secured to opposite sides thereof said clamping disks having annular outwardly bulged portions adjacent the rim thereof, the rims of said clamping disks yieldingly pressing against the central disk whereby an end of thread like material wound in the spaces between the central disk and the outwardly bulged portions of the clamping disks is clamped by the rim portions, said clamping disks having additional outwardly bulging portions inwardly of the annular outwardly bulged portions cooperating with the central disk to provide air pockets.

LESTER A. WOODLAND.
GLENN E. GAGE.

REFERENCES CITED

The following references are of record in the file of this patent:

UNITED STATES PATENTS

| Number | Name | Date |
|---|---|---|
| 1,692,517 | Replogle | Nov. 20, 1928 |
| 1,825,866 | Hieser et al. | Oct. 6, 1931 |

FOREIGN PATENTS

| Number | Country | Date |
|---|---|---|
| 642,835 | Germany | Mar. 18, 1937 |